(12) United States Patent
Ito et al.

(10) Patent No.: US 11,804,701 B2
(45) Date of Patent: Oct. 31, 2023

(54) ELECTRICAL JUNCTION BOX

(71) Applicant: YAZAKI CORPORATION, Tokyo (JP)

(72) Inventors: Norio Ito, Kakegawa (JP); Naoya Akiyama, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/896,654

(22) Filed: Aug. 26, 2022

(65) Prior Publication Data

US 2023/0068924 A1 Mar. 2, 2023

(30) Foreign Application Priority Data

Aug. 30, 2021 (JP) ................. 2021-140018

(51) Int. Cl.
*H02G 3/08* (2006.01)
*H01M 50/298* (2021.01)
*H01M 50/249* (2021.01)

(52) U.S. Cl.
CPC .......... *H02G 3/083* (2013.01); *H01M 50/298* (2021.01); *H01M 50/249* (2021.01); *H01M 2220/20* (2013.01)

(58) Field of Classification Search
CPC ........ H01B 7/08; H01B 7/0045; H01B 7/423; H01B 1/06; H01B 1/08; H01B 7/29; H01B 7/295; H01B 1/122; H01B 7/04; H01B 1/023; H01B 17/58; H01B 1/04; H01B 13/00; H01B 7/0823; H01B 17/26; H01B 17/56; H01B 7/009; H01B 7/292; H01B 13/06; H01B 5/02; H01B 9/006; H01B 9/00; H01B 7/0009; H01B 17/00; H01B 7/0838; H01B 3/445; H01B 7/28; H01B 1/24; H01B 13/0036; H01B 17/16; H01B 17/66; H01B 5/12; H01B 1/127; H01B 1/02; H01B 1/026; H01B 3/08; H01B 3/16; H01B 3/52; H01B 7/02; H01B 7/0216; H01B 7/0233; H01B 7/06; H01B 7/425; H01B 7/0807; H01B 13/012; H01B 13/01254; H01B 13/065; H01B 3/084; H01B 3/18; H01B 3/42; H01B 7/00;

(Continued)

(56) References Cited

U.S. PATENT DOCUMENTS 5,594,403 A * 1/1997 Taga ...................... H01H 85/20
337/186
2002/0134572 A1 * 9/2002 Matsumura .......... H01H 85/044
174/66

(Continued)

FOREIGN PATENT DOCUMENTS

JP 2006-44443 A 2/2006
JP 2011-176920 A 9/2011

*Primary Examiner* — Krystal Robinson
(74) *Attorney, Agent, or Firm* — Sughrue Mion, PLLC

(57) ABSTRACT

An electrical junction box is configured such that an electric or electronic component is mounted thereon. The electrical junction box includes a case having an accommodation recess, a housing configured such that the electric or electronic component is held therein and configured to be attached in the accommodation recess, and a cable configured to be drawn into the accommodation recess. The housing includes a path restricting wall configured to restrict a wiring direction of the cable.

3 Claims, 6 Drawing Sheets

(58) Field of Classification Search
CPC .... H01B 7/0072; H01B 7/041; H01B 7/0846; H01B 17/305; H01B 17/583; H01B 7/0018; H01B 1/10; H01B 1/18; H01B 12/04; H01B 12/12; H01B 12/16; H01B 13/10; H01B 17/18; H01B 3/002; H01B 3/02; H01B 3/025; H01B 3/04; H01B 3/12; H01B 3/22; H01B 3/305; H01B 3/40; H01B 3/443; H01B 7/18; H01B 7/24; H01B 13/0023; H01B 17/30; H01B 17/60; H01B 17/62; H01B 3/48; H01B 13/003; H01B 13/14; H01B 13/22
See application file for complete search history.

(56) References Cited

U.S. PATENT DOCUMENTS

| | | | |
|---|---|---|---|
| 2004/0115991 A1* | 6/2004 | Higuchi | H01H 85/2045 |
| | | | 439/620.27 |
| 2006/0030176 A1 | 2/2006 | Ikeda et al. | |
| 2011/0204715 A1 | 8/2011 | Nakamura et al. | |
| 2012/0048617 A1 | 3/2012 | Mihara et al. | |
| 2012/0249079 A1* | 10/2012 | Bennett | B60L 3/0046 |
| | | | 374/185 |
| 2017/0006718 A1 | 4/2017 | Haraguchi et al. | |
| 2018/0069449 A1* | 3/2018 | Grasso | H02K 3/50 |
| 2018/0254514 A1* | 9/2018 | Li | H01M 50/562 |
| 2019/0103694 A1* | 4/2019 | Mitsui | H01H 85/20 |
| 2019/0115703 A1* | 4/2019 | Kawaguchi | H01R 25/003 |

\* cited by examiner

ELECTRICAL JUNCTION BOX

CROSS-REFERENCE TO RELATED APPLICATION

The present application claims priority to Japanese Patent Application No. 2021-140018 filed on Aug. 30, 2021, the entire content of which is incorporated herein by reference.

TECHNICAL FIELD

The presently disclosed subject matter relates to an electrical junction box.

BACKGROUND

For example, a battery pack mounted on a hybrid vehicle or an electric vehicle is provided with an electric connection box, and a power supply cable is wired from the electrical junction box to a power supply destination such as an inverter or an auxiliary device (for example, see JP2006-44443A).

When vibration during traveling is applied to the electrical Junction box mounted on a vehicle, the cable drawn from an introduction portion of as case may come into contact with a surrounding electric and electronic component such as a bus bar or a fuse due to vibration, and may be damaged. In particular, since a wiring space of the cable is also narrowed due to space saving associated with miniaturization of the electrical junction box, the cable is likely to come into contact with the surrounding component.

For example, when an electric wire such as an electric power hue on a battery pack side is fastened to a fastening portion of the bus bar in the electrical junction box, it is necessary to pay attention to prevent the cable that has passed through the narrow space from being bitten at a fastening position, and wiring work becomes complicated.

SUMMARY

Illustrative aspects of the presently disclosed subject matter provide an electrical junction box excellent in wiring workability in which a cable drawn into an inside of the electrical junction box can be wired without difficulty while achieving a reduction in size.

According to an illustrative aspect of the presently disclosed subject matter, an electrical junction box is configured such that an electric or electronic component is mounted thereon. The electrical junction box includes a case having an accommodation recess, as housing configured such that the electric or electronic component is held therein and configured to be attached in the accommodation recess and a cable configured to be drawn into the accommodation recess. The housing includes a path restricting wall configured to restrict a wiring direction of the cable.

The presently disclosed subject matter has been briefly described above. Details of the presently disclosed subject matter will be further clarified by reading through a mode (hereinafter, referred to as "embodiment") for carrying out the presently disclosed subject matter to be described below with reference to the accompanying drawings.

BRIEF DESCRIPTION OF DRAWINGS

FIGS. 1A and 1B show an electrical junction box according to the present embodiment, in which FIG. 1A is a perspective view showing the electrical junction box as viewed from an attachment side to a battery pack, and FIG. 1B is a perspective view showing the electrical junction box as viewed from a side opposite to the attachment side to the battery pack;

DESCRIPTION OF EMBODIMENTS

Figure 1A:
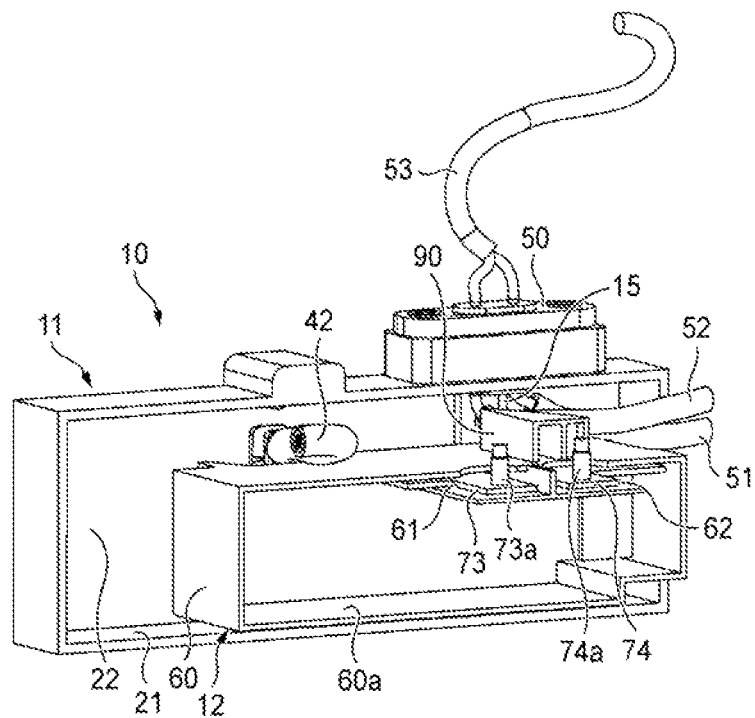
Figure 1B:
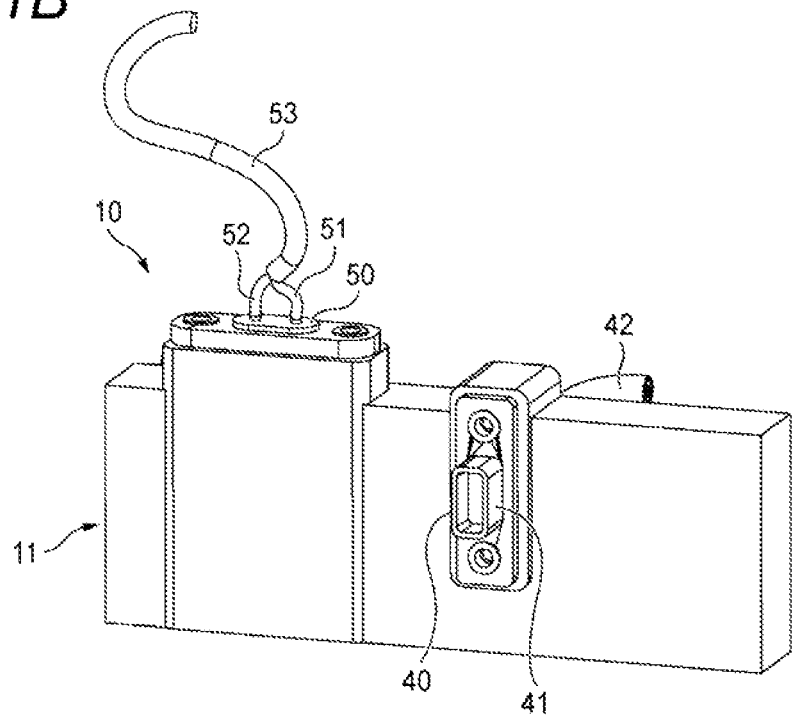
Figure 2:
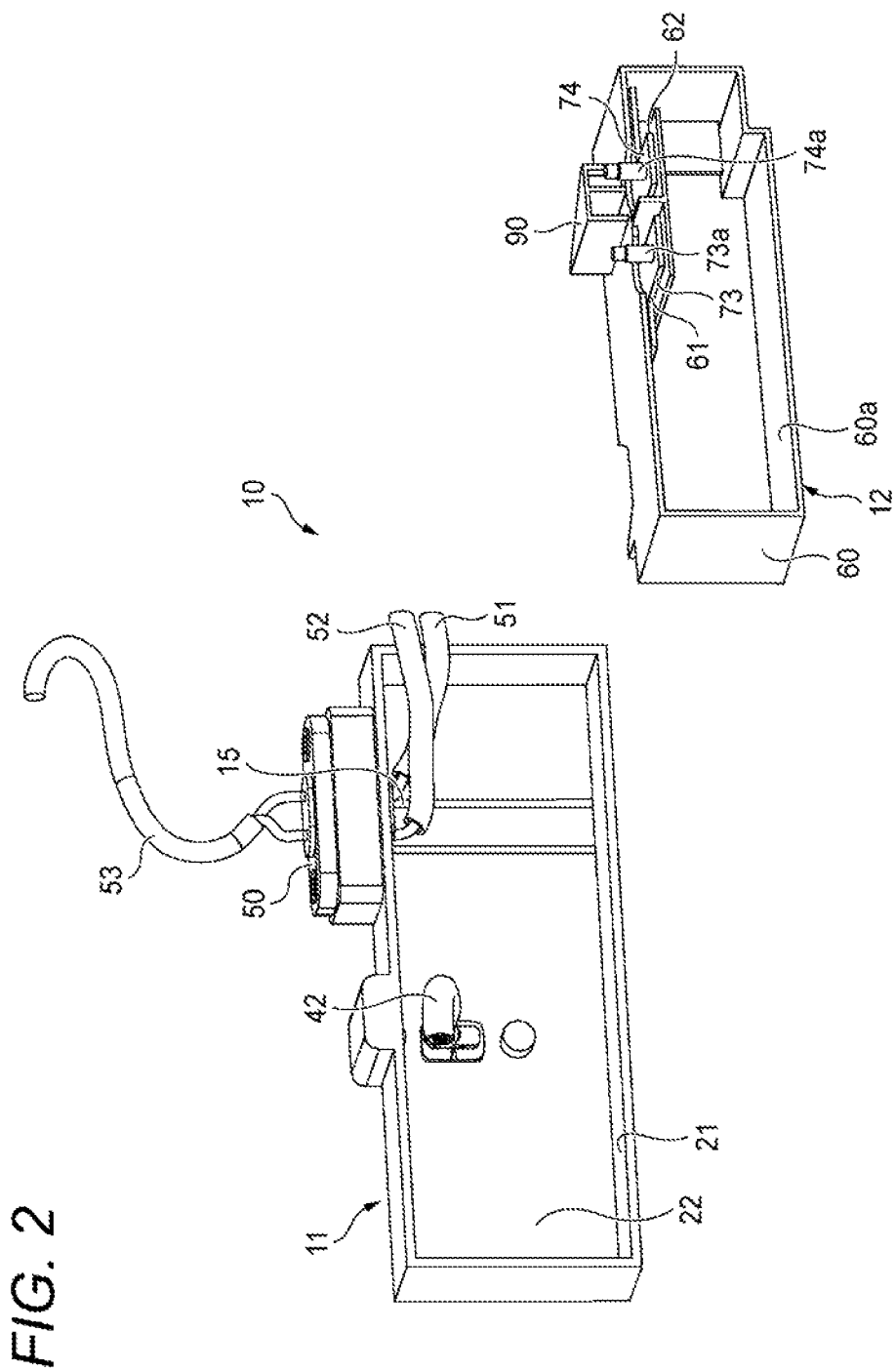
FIG. 2 is a perspective view of a case and a wiring unit that form the electrical junction box.

Hereinafter, an example of an embodiment according to the presently disclosed subject matter will be described with reference to the drawings. FIGS. 1A and 1B show an electrical junction box according to the present embodiment, in which FIG. 1A is a perspective view showing the electrical junction box as viewed from an attachment side to a battery pack, and FIG. 1B is a perspective view showing the electrical junction box as viewed from a side opposite to the attachment side to the battery pack. FIG. 2 is a perspective view of a case and a wiring unit that form the electrical junction box.

As shown in FIGS. 1A, 1B, and 2, an electrical junction box 10 according to the present embodiment includes a case 11 and a wiring unit 12. The electrical junction box 10 is assembled to, for example, a battery pack mounted on a hybrid vehicle or an electric vehicle.

The case 11 forming the electrical junction box 10 is molded from, for example, aluminum or an aluminum alloy, and has an accommodation recess 22 opened at an opening 21 on one side. The wiring unit 12 is assembled to the case 11 in a state of being accommodated in the accommodation recess 22 of the case 11.

The electrical junction box 10 is assembled to the battery pack by screwing a bolt (not shown) that is inserted into a bolt insertion hole (not shown) formed in the case 11 into a screw hole of the battery pack and fastening the bolt. Further, when the electrical junction box 10 is assembled to the battery pack, a space between the battery pack and the case 11 is sealed by a packing (not shown attached to an edge portion of the opening 21 of the case 11.

The case 11 is provided with a signal line connector 40 at a side portion at a center of the case 11 in a longitudinal direction. For example, a connector of a wire harness including a signal line extending from a control unit (ECU) is connected to the signal line connector 40.

The signal line connector 40 includes a connector housing 41 that accommodates a terminal (not shown) therein, and the connector housing 41 is fastened and fixed to the side portion of the case 11. The signal line connector 40 includes a signal cable 42 connected to a terminal provided inside the connector housing 41, and the signal cable 42 is drawn into the case 11.

The case 11 includes, at an upper portion thereof, a cable introduction portion 15 to which a cable lead-in member 50 is attached. In the cable introduction portion 15, cables 51, 52 are held by the cable lead-in member 50, and these cables 51, 52 are drawn into the accommodation recess 22 of the case 11 via the cable lead-in member 50. For example, one of the cables 51, 52 is a power supply line, and the other is an interlocking electric wire. These cables 51, 52 are pulled out from the cable lead-in member 50 and bundled, and are connected to a connector (not shown) for a seat heater as a wire harness 53 for the seat heater. The seat heater is an auxiliary device. The cables 51, 52 drawn into the accommodation recess 22 of the case 11 are connected to a power supply portion of the battery pack and an interlocking short terminal.

Figure 3:
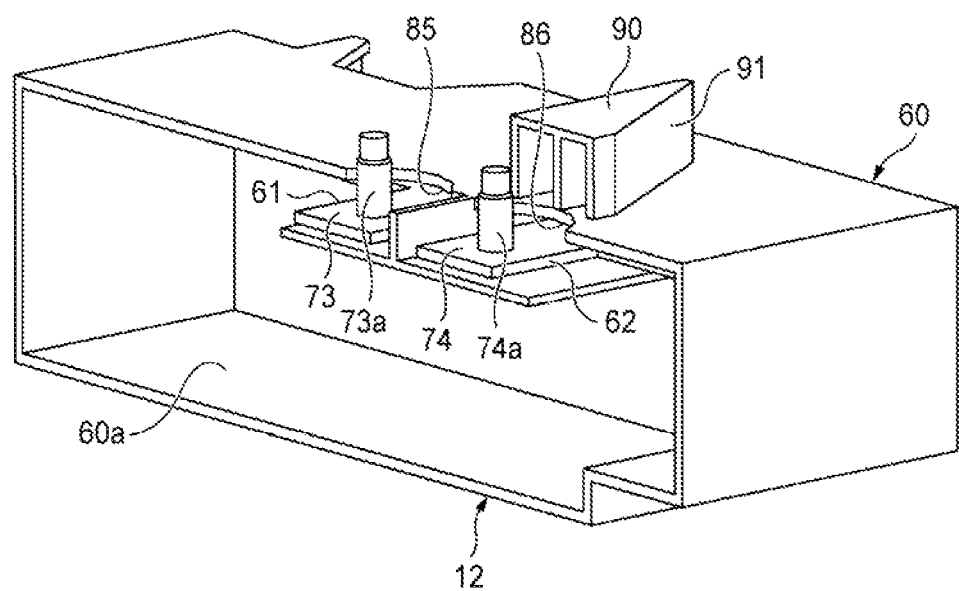
FIG. 3 is a perspective view of the wiring unit.

FIG. 3 is a perspective view of the wiring unit. As shown in FIG. 3, the wiring unit 12 includes a housing 60. The housing 60 is molded from an insulating synthetic resin. A positive electrode bus bar 61 and a negative electrode bus bar 62 are assembled to the housing 60. For example, a power supply line of a wire harness extending from an inverter is connected to the positive electrode bus bar 61 and the negative electrode bus bar 62.

An electric and electronic component such as a ferrite or a fuse is assembled to an accommodation space 60a inside the housing 60. Further, an opening side of the housing 60, to which the positive electrode bus bar 61, the negative electrode bus bar 62, the ferrite, and the fuse are assembled, is covered with a cover (not shown).

The housing 60 of the wiring unit 12 is assembled and housed in the accommodation recess 22 of the case 11 from the opening 21, and is fixed in this housed state with, for example, a bolt.

The positive electrode bus bar 61 and the negative electrode bus bar 62 include, at end portions thereof, fastening portions 73, 74 at which stud bolts 73a, 74a are erected. The housing 60 has engagement grooves 85, 86. In the positive electrode bus bar 61 and the negative electrode bus bar 62 that are assembled to the housing 60, the fastening portions 73, 74 are engaged with the engagement grooves 85, 86.

Figure 4:
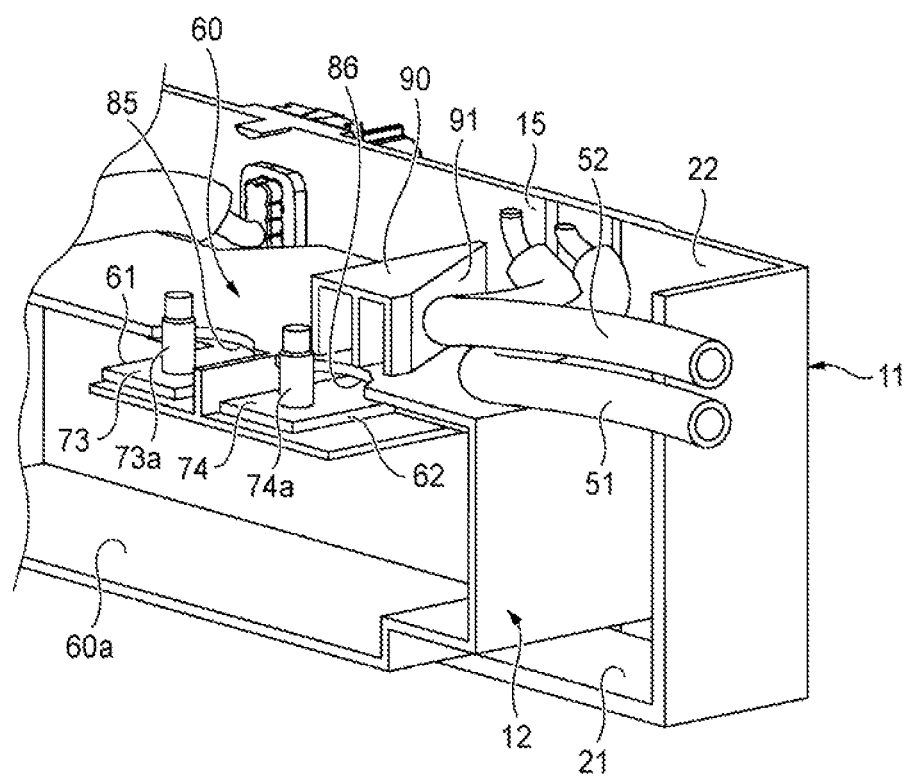
FIG. 4 is a perspective view of an upper portion of a housing provided with as path restricting wall.
Figure 5:
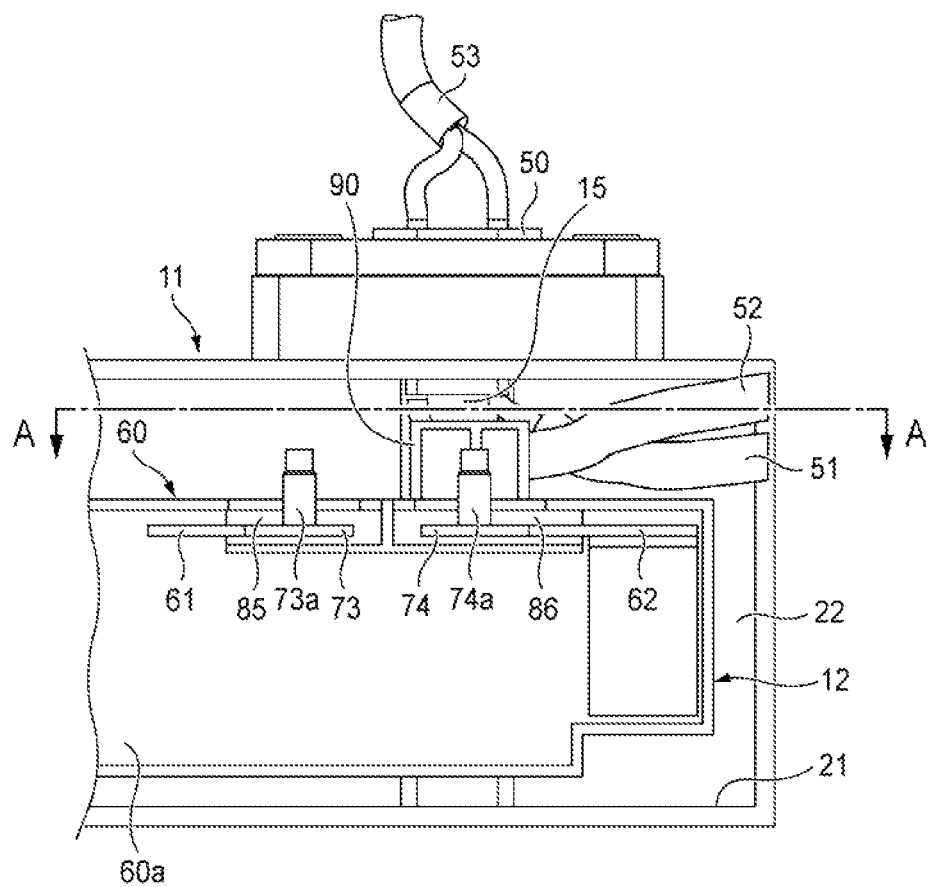
FIG. 5 is a front view of a part of a cable introduction portion of the electrical junction box as viewed from the attachment side to the battery pack.
Figure 6:
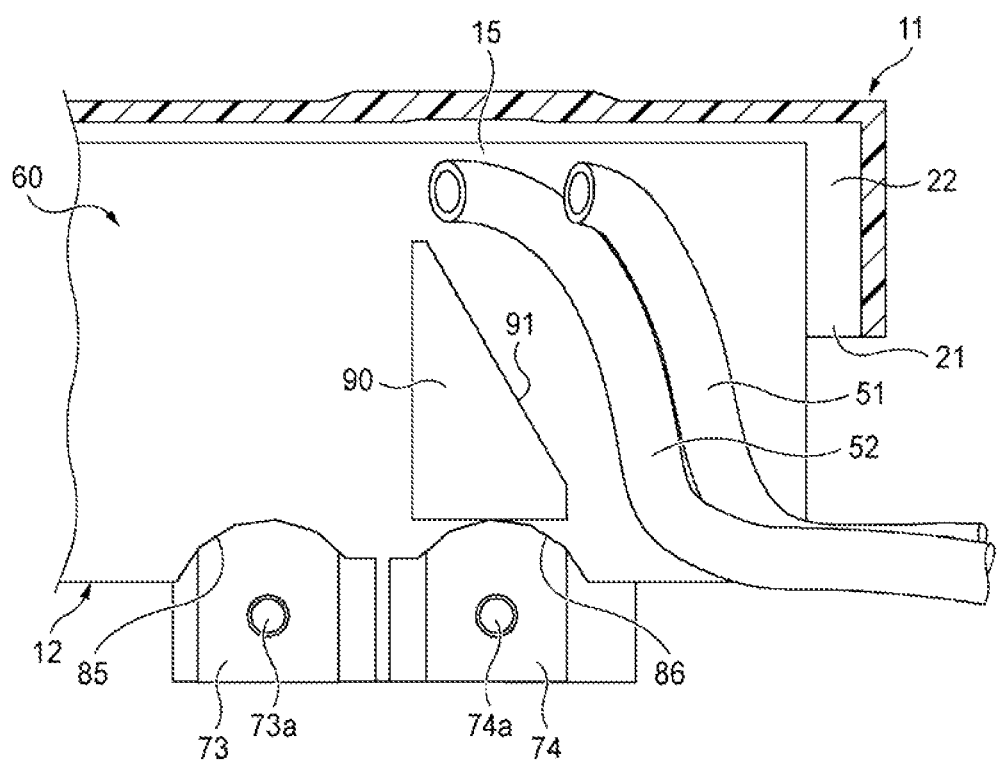
FIG. 6 is a cross-sectional view taken along a line A-A in FIG. 5.

FIG. 4 is a perspective view of an upper portion of a housing provided with a path restricting wall. FIG. 5 is a front view of a part of a cable introduction portion of the electrical junction box as viewed from the attachment side to the battery pack. FIG. 6 is a cross-sectional view taken along a line A-A in FIG. 5.

As shown in FIGS. 4 to 6, the housing 60 forming the wiring unit 12 includes a path restricting wall 90. The path restricting wall 90 is formed integrally with the upper portion of the housing 60.

The path restricting wall 90 is provided in a vicinity of an inner side surface of the case 11 below the cable introduction portion 15 to which the cable lead-in member 50 in the case 11 is attached and the cables 51, 52 are drawn into the case 11. Further, the path restricting wall 90 is provided on a back side, which is a rear position with respect to the fastening portions 73, 74 of the positive electrode bus bar 61 and the negative electrode bus bar 62 that are engaged with the engagement grooves 85, 86 of the housing 60.

A rear surface of the path restricting wall 90 is a guide surface 91. The guide surface 91 is an inclined surface that is gradually inclined laterally toward the front of the housing 60.

The cable 51, 52 drawn into the accommodation recess 22 from the cable introduction portion 15 of the case 11 is restricted in a wiring direction thereof by the path restricting wall 90 formed integrally with the housing 60. Specifically, the wiring direction of the cables 51, 52 is gradually guided laterally toward the front of the housing 60 by the guide surface 91 of the path restricting wall 90. Accordingly, the cables 51, 52 are guided in a direction away from the fastening portions 73, 74 of the positive electrode bus bar 61 and the negative electrode bus bar 62 that are provided in front of the cable introduction portion 15.

In order to assemble the electrical junction box 10 having the above-described structure, the housing 60 of the wiring unit 12 is accommodated in the accommodation recess 22 of the case 11 and fastened to the case 11 with bolts. Accordingly, the wiring unit. 12 is fixed in a state of being accommodated in the accommodation recess 22 of the case 11. Accordingly, the electrical junction box 10, in which the wiring unit 12 is assembled, is attained in the accommodation recess 22 of the case 11.

As described above, when the housing 60 of the wiring unit 12 is assembled to the accommodation recess 22 of the case 11, the cables 51, 52 drag U into the accommodation recess 22 from the cable introduction portion 15 of the case 11 are pushed laterally by the path restricting wall 90 formed integrally with the housing 60. Further, the cables 51, 52 are gradually guided laterally along the guide surface 91 oldie path restricting wall 90. The path restricting wall 90 of the housing 60 is provided at a position where an upper edge portion of the path restricting wall 90 is close to the inner side surface of the case 11. Therefore, the cables 51, 52 are not wired, through a space between the path restricting wall 90 and an inner surface of the case 11, to the front where the fastening portions 73, 74 of the positive electrode bus bar 61 and the negative electrode bus bar 62 are provided.

In order to assemble the electrical junction box 10 assembled in this manner to the battery pack, a connector or a terminal (not shown) provided at end portions of the signal cable 42 and the cables 51, 52 is connected to a connector or a terminal on a battery pack side. Further, terminals of power cables on the battery pack side are fastened to the fastening portions 73, 74 of the positive electrode bus bar 61 and the negative electrode bus bar 62 with nuts. At this time, the cables 51, 52 drawn into the case 11 from the cable introduction portion 15 are wired at positions away from the fastening portions 73, 74 of the positive electrode bus bar 61 and the negative electrode bus bar 62. Therefore, when the terminals of the power cables on the battery pack side are fastened to the fastening portions 73, 74 with the nuts, the cables 51, 52 are not bitten at fastening positions. That is, it is not necessary to perform a fastening operation while paying attention to prevent the cables 51, 52 from being bitten.

The electrical junction box 10 is assembled to the battery pack in a state of being sealed by a packing, by fastening the case to the battery pack with bolts after wiring with the battery pack.

As described above, according to the electrical junction box 10 in the present embodiment, the housing 60 of the wiring unit 12 assembled into the accommodation recess 22 of the case 11 includes the path restricting wall 90 that restricts the wiring direction of the cables 51, 52 drawn into the accommodation recess 22 of the case 11. Therefore, the cables 51, 52 drawn into the accommodation recess 22 of the case 11 can be wired along a preset path by restricting the wiring direction in a narrow space.

Accordingly, it is possible to prevent interference between the drawn cables 51, 52 and the electric and electronic component and the like while achieving a reduction in size. For example, when the electric wires are fastened and connected to the fastening portions 73, 74 of the positive electrode bus bar 61 and the negative electrode bus bar 62, it is possible to prevent the cables 51, 52 drawn into the accommodation recess 22 of the case 11 from being bitten to the fastening positions. Accordingly, it is possible to improve internal wiring workability.

Since the path restricting wall 90 has the guide surface 91 that guides the cables 51, 52 to the set wiring path, the cables 51, 5:2 drawn into the accommodation recess 22 of the case H can be guided by the guide surface 91 of the path restricting wall 90, and can be wired without difficulty along the preset wiring path.

According to the electrical junction box 10, the cables 51, 52 and the like that are wired without difficulty in the case 11 can be smoothly wired to the battery pack side and assembled to the battery pack.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

According to an aspect of the embodiments described above, an electrical junction box (10) is configured such that an electric or electronic component (for example, a positive electrode bus bar 61, a negative electrode bus bar 62, a ferrite, and a fuse) is mounted thereon. The electrical junction box (10) includes a case (11) having an accommodation recess (22), a housing (60) configured such that the electric or electronic component (the positive electrode bus bar 61, the negative electrode bus bar 62, the ferrite, and the fuse) is held therein and configured to be attached in the accommodation recess (22) and a cable (51, 52) configured to be drawn into the accommodation recess (2:2). The housing (60) includes a path restricting wall (90) configured to restrict a wiring direction of the cable (51, 52).

According to the electrical junction box having the above-described configuration, the housing assembled into the accommodation recess of the case includes the path restricting wall that restricts the wiring direction of the cable drawn into the accommodation recess of the case. Therefore, the cables drawn into the accommodation recess of the case can be wired along a preset path by restricting the wiring direction in a narrow space. Accordingly, it is possible to prevent interference between the drawn cables and the electric and electronic component and the like while achieving a reduction M size. For example, when the electric wire is fastened to the fastening portion of the bus bar, it is possible to prevent the cable drawn into the accommodation recess of the case from being bitten to the fastening position. Accordingly, it is possible to improve internal wiring workability.

The path restricting wall (90) may have a guide surface (91) configured to guide the cable (51, 52) along a predetermined wiring path.

With this configuration, the cable drawn into the accommodation recess of the case can be guided by the guide surface of the path restricting wall, and can be wired without difficulty along the preset wiring path.

The case (11) may be configured such that an opening side of the accommodation recess (22) is attached to a battery pack, and the cable (51, 52) may be configured to be wired to the battery pack.

With this configuration, the cable that is wired without difficulty in the case can be smoothly wired to the battery pack side and assembled to the battery pack.

What is claimed is:

1. An electrical junction box configured such that an electric or electronic component is mounted thereon, the electrical junction box comprising:
   a case having an accommodation recess;
   a housing configured such that the electric or electronic component is held therein and configured to be attached in the accommodation recess; and
   a cable configured to be drawn into the accommodation recess,
   wherein the case is provided with a cable introduction portion that holds the cable at an upper portion of the case,
   wherein the housing includes a path restricting wall configured to restrict a wiring direction of the cable, and
   wherein the path restricting wall is positioned below the cable introduction portion.

2. The electrical junction box according to claim 1, wherein the path restricting wall has a guide surface configured to guide the cable along a predetermined wiring path.

3. The electrical junction box according to claim 1, wherein the case is configured such that an opening side of the accommodation recess is attached to a battery pack, and
   wherein the cable is configured to be wired to the battery pack.

* * * * *